United States Patent [19]

Steen et al.

[11] Patent Number: 4,726,715
[45] Date of Patent: Feb. 23, 1988

[54] SCREW POWDER FEEDERS

[75] Inventors: William M. Steen, New Malden; Vijitha M. Weerasinghe, London, both of England

[73] Assignee: Quantum Laser Corporation, Edison, N.J.

[21] Appl. No.: 876,863

[22] PCT Filed: Oct. 11, 1985

[86] PCT No.: PCT/GB85/00456
§ 371 Date: Jun. 9, 1986
§ 102(e) Date: Jun. 9, 1986

[87] PCT Pub. No.: WO86/02337
PCT Pub. Date: Apr. 24, 1986

[30] Foreign Application Priority Data

Oct. 11, 1984 [GB] United Kingdom ............... 8425716

[51] Int. Cl.4 ............................................. B65G 53/48
[52] U.S. Cl. ...................................... 406/55; 222/413; 222/195; 198/661; 198/662; 198/550.1; 406/61
[58] Field of Search ........................... 406/55, 56, 61; 222/413, 195; 198/550.1, 661, 662, 676

[56] References Cited

U.S. PATENT DOCUMENTS

| 954,944 | 4/1910 | Dunn | 406/56 |
| 1,195,186 | 8/1916 | Coutant | 406/55 |
| 1,450,903 | 4/1923 | Newhouse | 406/61 X |
| 1,948,812 | 2/1934 | Williams | 406/61 |
| 2,127,693 | 8/1938 | McCanless et al. | 406/61 |
| 3,004,799 | 10/1961 | Tikal | 406/55 |
| 3,099,496 | 7/1963 | Kayser | 406/61 X |
| 4,502,820 | 3/1985 | Fujii et al. | 406/56 |

FOREIGN PATENT DOCUMENTS

| 1265321 | 5/1961 | France | 406/61 |
| 2248215 | 5/1975 | France | 198/676 |
| 44447 | 3/1980 | Japan | 222/413 |
| 735523 | 5/1980 | U.S.S.R. | 406/55 |

Primary Examiner—Joseph F. Peters, Jr.
Assistant Examiner—James M. Kannofsky
Attorney, Agent, or Firm—Shlesinger, Arkwright & Garvey

[57] ABSTRACT

A screw powder feeder has a rotary screw (12) disposed at the base of a hopper (10). The screw (12) comprises a twist drill bit. Powder is discharged into a chamber (18) and picked-up by a flow of gas. The pressure in chamber (18) is varied relative to the pressure in hopper (10) to control the feed rate for a given screw speed. Ultra-low feed rates are made possible by feeding gas into the hopper (10) through the screw (12) and controlling the relative gas pressures such that the pressure in the chamber (18) exceeds the pressure in hopper (10).

17 Claims, 3 Drawing Figures

SCREW POWDER FEEDERS

This invention concerns the uniform feeding of irregular and regular shaped powder material at low mass feed rates.

There are many occasions on which solid powdered material has to be fed at uniform feed rates. These vary from pharmaceuticals and metal spraying to coal fired boilers and bulk food processing. In consequence numerous powder feeders are available based on a variety of principles, e.g. vibratory feeders, inverted weir and belt feeders, rotary disc feeders and screw feeders.

Nearly all these feeders have problems with "bridging" of the powder, particularly when irregular and/or very fine powders are to be fed. Screw feeders suffer from a further problem of "blinding" of the screw, whereby the powdered material rotates with the screw rather than being fed.

All feeders suffer from some form of slubbing of the mass flow. In certain processes, e.g. laser cladding with blown powder, this slubbing is of critical importance.

Providing a uniform powder flow at ultra-low feed rates is particularly difficult because, whatever the feeding mechanism, there is a conflicting requirement for a small aperture to achieve a low feed rate and a critical aperture to prevent "arching" of the powder, coupled with the additional requirement of high rotary/vibratory speeds to eliminate cyclic effects.

One object of the present invention is to provide a screw powder feeder which avoids, or at least reduces, screw "blinding" and "bridging" near the screw. The screw may then be rotated at higher speeds which in turn reduces the observable slubbing effects.

Another object of the invention is to provide a feeder capable of uniform powder flow at lower feed rates than is possible with existing feeders.

A still further object of the invention is to reduce the cost of screw powder feeders.

According to one aspect of the invention, the screw in a screw powder feeder comprises at least two helical flutes, angularly spaced at 180° to one another.

In one particular embodiment the screw comprises a twist drill bit having a ridge along the leading or 'cutting' edge of the helical thread, the ridge normally helping to remove the swarf by providing some clearance against binding when the bit is used in a twist drill. Twist drill bits are inexpensive and widely available, thereby substantially reducing the cost of the screw feeder. Moreover, the long pitch of the flutes on a twist drill bit increase the "pumping" velocity parallel to the screw axis, thus giving extra momentum to the powder particles along the flutes in the required direction of feed. The outwardly projecting ridge which assits the powder feed by cutting through the powder and displacing it into the flutes effectively increases the "aperture" of the feeder for gravity flow.

In one possible alternative, the rotary screw comprises a milling cutter having four angularly spaced helical flutes at 90° to one another.

Ridged threads or finned threads over a short length of the screw may alternatively be used to assist displacement of the powder into the groove or grooves.

The feeder may include a gravity feed hopper and, according to a further aspect of the invention, the feeding of powders which do not flow smoothly under gravity is assisted by discharging a gas into the powder in the vicinity of the screw, the quantity of gas being just sufficient to break down static arching of the powder at the outlet aperture of the hopper. The resulting dynamic arch collapse produces a uniform gravity flow on to the rotary screw which then conveys the powder into a discharge line.

The gas is preferably introduced into a longitudinal bore of the screw and emerges periodically at the surface of the screw through fine holes located in a predetermined sector of the screw and communicating with the bore, the gas being discharged only when the holes are facing upwards.

According to a still further aspect of the invention, the powder is fed under a predetermined pressure to the screw and discharged by the screw into a chamber, the pressure in the chamber being varied against the applied pressure to control the feed rate for a given screw speed. In this manner ultra-low feed rates can be achieved while still maintaining a uniform flow.

The applied pressure is preferably controlled by controlling the gas pressure in a gravity feed hopper. A relatively low hopper pressure increases "slip" by reducing friction between the powder particles and the screw surface and/or by inducing a backward flow of gas into the hopper.

The powder discharged by the screw is preferably picked up in the chamber by a gas stream, the powder being discharged into an aerodynamically tranquil zone of the chamber before being entrained in the gas stream. The same gas supply may be used to pressurize the hopper through a valve located in a pressure equalising branch line disposed upstream of the chamber.

By way of example only, an embodiment of the invention is illustrated in the accompanying drawings, in which.

Figure 3:
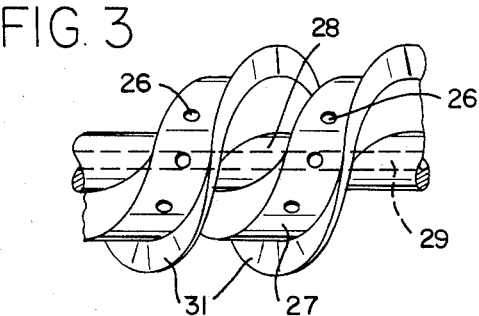
FIG. 3 illustrates part of one alternative screw.

Referring to the drawings, a gravity feed hopper 10 feeds powder 11 to a screw 12 comprising a hardened steel twist drill bit with a pair of helical flutes 28 which are angularly spaced by 180° and intersect a conical point 34 to provide cutting edges of a specific rake. In the present case, however, the conical point is redundant and could be removed. A continuous ridge 30 around the leading or 'cutting' edge of the spiral screw thread 27 cuts through the powder as the screw is rotated and thereby displaces powder into the flutes. This action effectively increases the 'aperture' for gravity flow of the powder. It also assists in preventing binding or compression of powder in the flutes and improves the durability of the feeder. In one alternative arrangement shown in FIG. 3, the ridge 30 is replaced by fins 31 projecting from the screw thread 27.

The screw 12 is spaced just above the floor of the hopper, and extends through aligned openings 32, 33 in the opposed side walls 13, 14. The two helical flutes 28 increase the number of 'pick-up' points compared to the number of such points in a conventional screw feeder having only one groove. One end of the screw is rotatably mounted in a bearing 38 located in a bearing housing 15 outside the hopper and is driven by a variable speed motor 16. An O-ring 17 provides a gas-tight seal in the opening 32 in side wall 13. The side walls 13, 14 are formed of a proprietary thermoplastic resin material so that, in use, fine particles of the powder 11 become embedded in the resin around the opening 32 to provide a continuous seal reinforcing the seal provided by O-ring 17.

The discharge end of the screw rotates within a bush 35 located in an outlet opening 33 in the side wall 14 and projects into a closed gas chamber 18 having a discharge passage 19. A gasket 20 seals the joint between chamber 18 and hopper 10.

Powder discharged by screw 12 into chamber 18 is picked up by a flow of argon gas delivered to the chamber through a delivery line 21. The metered quantity of powder is discharged into the chamber 18 in a non-turbulent region above the outlet of the delivery line 21, and is then entrained into the gas flow as it falls toward the base of the chamber.

A low uniform flow rate (e.g. 0.020 g/s for stainless steel powder of 300 mesh size) is achieved by suitably balancing the gas pressure inside the hopper 10 against the gas pressure in the chamber 18. This is achieved by pressurising the hopper through a needle valve or pressure regulator 22 connected in a pressure equalising line 23 which branches from the delivery line 21 at a T-junction 24 upstream of the chamber 18.

The powder flow is also controlled independently of the conveying gas flow by varying the screw rotation speed.

Figure 1:
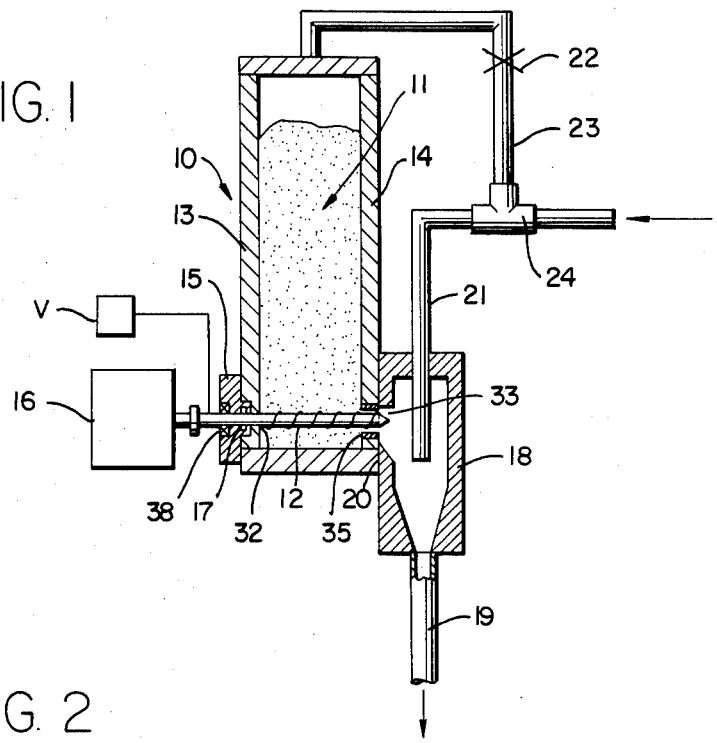
FIG. 1 is a general arrangement of a screw powder feeder embodying the invention.
Figure 2:
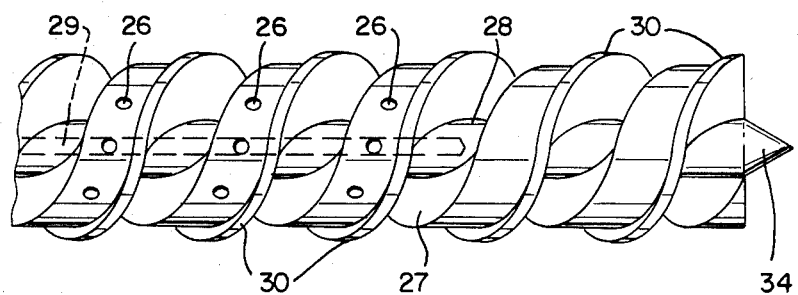
FIG. 2 illustrates one form of screw for use in the feeder of FIG. 1.

In the above design, the powder is fed initially on to the screw flutes by gravity. This would normally preclude uniform feeding of fine cohesive powders (say 10 $\mu$m) which do not flow smoothly under gravity. However, feeding of such powders is made possible by blowing gas, preferably a shrouding gas such as argon, through small holes 26 (FIG. 2) located in the thread 27 between the machined flutes 28 of the rotating screw 12. The holes 26 have a diameter of between 10 and 200 $\mu$m and communicate with a central blind bore 29 into which the gas is fed from either an external or an internal source. The holes 26 are located in only one sector of the screw, and a valving arrangement V ensures that gas is admitted into the bore 29 only when the sector containing the holes 26 is facing upwards.

The gas periodically emerging from the holes 26 breaks up static arch formation above the screw. The result is that the screw is uniformly gravity fed by way of dynamic arch collapse.

When using the above screw to feed fine cohesive powders, valve 22 is placed on line 21 and line 23 is connected into a special bearing housing similar to housing 15 which has rotary seals (not shown) to facilitate gas injection into the central bore of the rotary screw. In operation, valve 22 is fully open initially so that there is very little flow of gas through line 23 into the screw. Under these circumstances no powder discharge is usually observed because the particular cohesive powders do not flow under gravity onto the screw. Valve 22 is then progressively closed to by-pass an increasing amount of gas into the screw through line 23 until at one point, and depending on the cohesiveness of the particular powder, discharge of powder is observed at 19. Valve 22 is then retained in this partially closed position.

With this arrangement, line 23 is no longer connected to the top of the hopper but another valve (not shown) is fitted onto the hopper lid and vents into the atmosphere. The pressure within the hopper is then regulated by using this valve.

In either case the pressure within the hopper is preferably less than the pressure in the chamber 18 to induce a backward flow of gas into the hopper which increases 'slip' by reducing friction between the powder particles and the screw surface and/or induces a backward flow of gas into the hopper.

Uniform loading of the rotating screw feeder is ensured by the balanced gas pressure across the feeder and can be further ensured by having steeply sloped hopper walls (not shown).

We claim:

1. A screw powder feeder, comprising:
   (a) a first chamber for receiving a supply of powder and including a first gas inlet and a first gas/powder outlet;
   (b) a second chamber having a second gas inlet, a second gas/powder outlet and a first gas/powder inlet communicating with said first gas/powder outlet;
   (c) screw conveyor means positioned within said first chamber in alignment with said first gas/powder outlet and including a longitudinal body mounted for rotation on a longitudinal axis thereof and having a central longitudinal bore, at least two helical flutes disposed in said body and defining a pair of threads and a plurality of apertures disposed in said threads and longitudinally spaced along said body and communicating with said bore;
   (d) means operably associated with said conveyor means for rotating said body;
   (e) means operably associated with said bore for supplying a first pressurized gas thereto so that the gas exits said apertures and thereby permits powder to be transported by said rotating body through said first gas/powder outlet and into said second chamber;
   (f) second means operably associated with said gas inlets for supplying a second pressurized gas thereto; and,
   (g) at least a portion of said flutes being provided with outwarding projecting means for directing powder into said flutes.

2. A feeder according to claim 1 in which said outwardly projecting means comprises a continuous ridge disposed around a leading edge of a helical thread formed by said helical flutes.

3. A feeder according to claim 1 wherein a powdered material is fed under a predetermined pressure to said conveyor means and is discharged by said body into said second chamber, the pressure in said second chamber being varied against the applied pressure to control the feed rate at a given body speed.

4. A feeder according to claim 3 in which said first chamber is a gravity feed hopper.

5. A feeder according to claim 1 in which said second gas inlet is disposed upstream of said first gas/powder inlet in an aerodynamically tranquil zone of said second chamber.

6. A feeder according to claim 1 in which said apertures are disposed only in a predetermined sector of said body, and in which the admission of gas to said bore is dependent on the relative angular position of the sector in each revolution of said body.

7. The feeder of claim 1, wherein:
   (a) said second gas inlet and second gas/powder outlet being longitudinally aligned, with said second gas inlet being upstream of said second gas/powder outlet; and,
   (b) said body extending generally transverse to said aligned second gas inlet and second gas/powder outlet.

8. The feeder of claim 1, wherein:
(a) valve means being in flow communication with said second means for regulating the flow of gas to said chambers.

9. The feeder of claim 7, wherein:
(a) first body opening being disposed in said first chamber coaxial with said first gas/powder outlet; and,
(b) said body rotatably extending between said first body opening and said first gas/powder outlet.

10. The feeder of claim 9, wherein:
(a) a bearing housing having a portion thereof mounted within said first body opening and including a bearing opening through which said body extends.

11. The feeder of claim 1, wherein:
(a) said apertures having a diameter of from about 10 μm to about 200 μm.

12. A powder feeder for fine cohesive powders, comprising:
(a) a gravity feed hopper having a first inlet at one end thereof and a first outlet in a sidewall thereof;
(b) a chamber operably associated with said hopper and having a second inlet at one end thereof, a second outlet at an opposite end thereof and a third inlet in a sidewall thereof in communication with said first outlet;
(c) gas supply means operably associated with said first and second inlets for supplying a pressurizing gas thereto;
(d) screw means journaled within said hopper in alignment with said first outlet and third inlet for transporting a powder from said hopper to said chamber so that the powder will exit therefrom through said second outlet;
(e) at least two helical flutes disposed in said screw means and defining a pair of threads, each thread having a trailing edge and a leading edge and means extending from one of said edges for displacing powder in said chamber into said threads;
(f) a bore extending longitudinally through said screw means and including means at one end thereof for connection with a source of pressurized gas;
(g) a plurality of apertures disposed in said threads and communicating with said bore so that pressurizing gas will exit said apertures and permit powder to flow by breaking up static arch formation in the powder above said screw means; and,
(h) means for rotating said screw means.

13. The feeder of claim 12, wherein:
(a) said second inlet and second outlet being longitudinally aligned, with said second inlet being disposed upstream of said second outlet; and,
(b) said screw means extending generally transverse to said aligned second inlet and outlet.

14. The feeder of claim 13, wherein:
(a) said apertures each having a diameter of from about 10 μm to about 200 μm; and,
(b) said screw means having a plurality of sectors, and said apertures being disposed in only one of said sectors.

15. The feeder of claim 14, wherein:
(a) valve means being operably associated with said gas supply means for regulating the flow of gas to said hopper and to said chamber.

16. The feeder of claim 13, wherein:
(a) a gas delivery line being in flow communication with said gas supply means and extending through said second inlet and thereby into said chamber, said line having an opening disposed below said third inlet and said first outlet.

17. The feeder of claim 12, wherein:
(a) said bore being blind so that gas introduced therein will exit said apertures into said hopper.

* * * * *